(12) United States Patent
Thibaut

(10) Patent No.: US 6,216,310 B1
(45) Date of Patent: Apr. 17, 2001

(54) WINDSCREEN WIPER ARM AND METHOD FOR MANUFACTURING THE WINDSCREEN WIPER ARM

(75) Inventor: Fernand Thibaut, Eischen (BE)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/297,681

(22) PCT Filed: Nov. 6, 1997

(86) PCT No.: PCT/EP97/06172

§ 371 Date: Sep. 9, 1999

§ 102(e) Date: Sep. 9, 1999

(87) PCT Pub. No.: WO98/19898

PCT Pub. Date: May 14, 1998

(30) Foreign Application Priority Data

Nov. 7, 1996 (EP) .................................................. 96203104

(51) Int. Cl.⁷ ...................................................... B60S 1/32
(52) U.S. Cl. .................. 15/250.351; 15/250.31; 29/509; 29/407.05; 403/274
(58) Field of Search ..................... 15/250.351, 250.352, 15/250.31; 29/897.2, 505, 514, 513, 509, 407.05; 403/274

(56) References Cited

U.S. PATENT DOCUMENTS 2,507,279 5/1950 Smulski ........................... 15/250.351
3,022,651 * 2/1962 Oberem .................................. 29/509

FOREIGN PATENT DOCUMENTS

| 41 40 959 A1 | 11/1992 | (DE) . |
| 2099853 | 3/1972 | (FR) . |
| 2 534 206 | 4/1984 | (FR) . |
| 1402577 * | 8/1975 | (GB) .............................. 15/250.352 |
| 2 069 325 | 8/1981 | (GB) . |
| WO 98/19898 | 5/1998 | (WO) . |

* cited by examiner

Primary Examiner—Gary K. Graham
(74) Attorney, Agent, or Firm—Reising, Ethington, Barnes, Kisselle, Learman & McCulloch, P.C.

(57) ABSTRACT

A windscreen wiper, for example for an automobile, which is provided with an arm comprising a first part and a second part connected thereto. At the location of the connection, said first part is bar-shaped and said second part comprises plate material which is bent round said first part. The two parts are fixed with respect to each other in that the plate material of said second part is locally deformed at its edge in such a manner as to extend into a recess in said first part, whereby said recess is provided with an edge comprising a straight portion, which extends in a direction transversely to said bar-shaped first part, whereby the deformation at the edge of the plate material comprises a cut in said edge, whereby an edge formed by said cut butts against said straight portion of the edge of said recess.

12 Claims, 2 Drawing Sheets

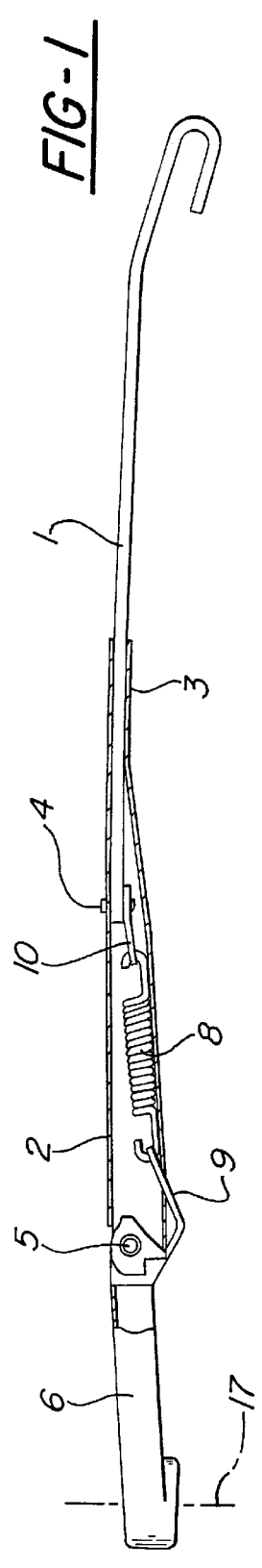
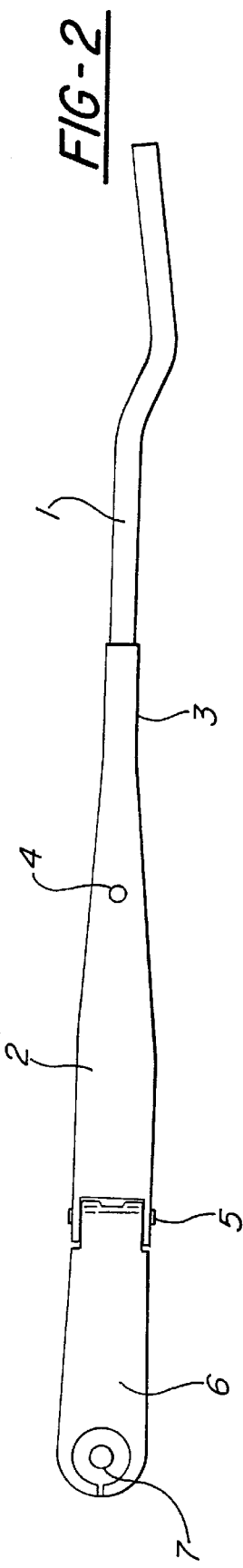
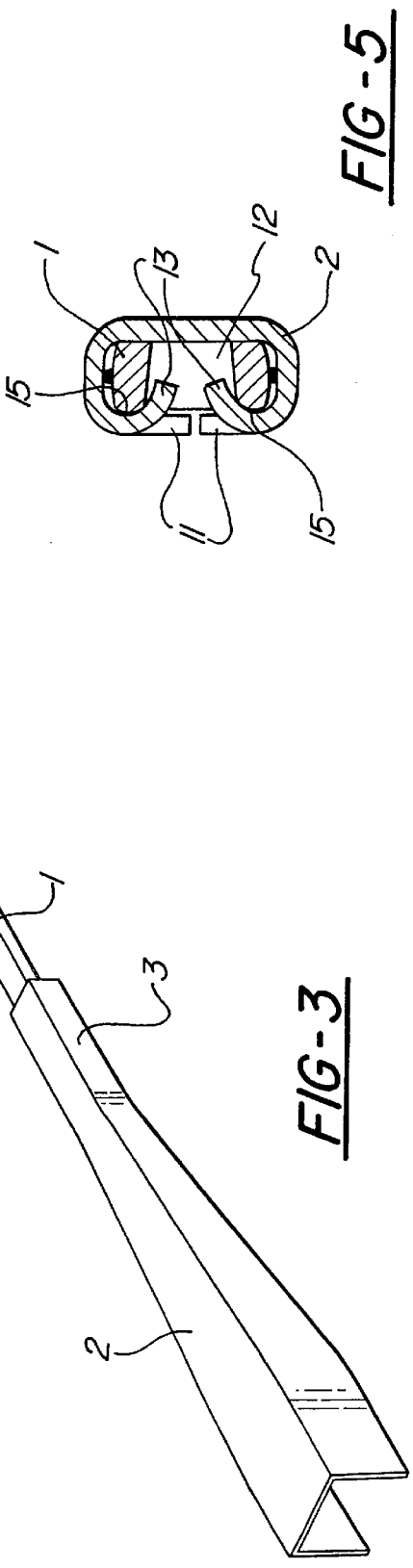

WINDSCREEN WIPER ARM AND METHOD FOR MANUFACTURING THE WINDSCREEN WIPER ARM

BACKGROUND

The invention relates to a windshield or windscreen wiper, for example for an automobile, which is provided with an arm comprising a first part and a second part connected thereto, whereby, at the location of the connection, said first part is bar-shaped and said second part comprises plate material and is bent round said first part, which two parts are fixed with respect to each other in that the plate material of said second part is locally deformed at its edge in such a manner as to extend into a recess in said first part. A windscreen wiper of this type is known from Fr-A-2,099,853.

SUMMARY

The first part of the wiper arm is at least partially bar-shaped and may be detachably connected to the wiper blade at one end, whilst the other end is fixedly connected to the second part of the wiper arm. Said second part is at least partially made of plate material and may be pivoted to a fastening portion which may be mounted on a shaft having oscillating rotating motion. Said shaft extends substantially perpendicularly to the plane of the windscreen across which the wiper blade moves. Furthermore a spring may be provided, which pulls the wiper against the windscreen, said spring on the one hand engaging said fastening portion and on the other hand engaging said wiper arm.

The first part and the second part of the wiper arm are interconnected by bending the plate material of the second part round the bar-shaped first part, so that the second part forms a channel at the location of said connection, through which channel the first part extends.

In order to prevent the first part from moving in the channel formed by the second part, the bar-shaped first part of the wiper according to the aforesaid FR-A-2,099,853 is provided with two round holes, and the plate material of the second part is deformed at its edge in such manner as to extend into said holes. As a result of that it is no longer possible for the first part to be moved out of the channel formed by the second part. Since metal exhibits a tendency to spring back slightly after being deformed, it is difficult to effect a reliable connection in this manner, that is, a connection which does not allow any movement of the first part with respect to the wiper, not even when the deformation of the plate material of the second part takes place at two different locations, as is the case with the wiper arm according to aforesaid FR-A-2,099,853.

A reliable connection without any play between the first part and the second part of the wiper arm may be obtained by punching or drilling a hole through said first part and said second part and to provide a rivet through said hole. A drawback of this is the presence of the rivet head on the plate material of the second part, which is undesirable for aesthetic and other reasons. In addition to that such a rivet constitutes an additional part of the wiper arm.

The object of the invention is to provide a satisfactory connection between the first part and the second part of the wiper arm in an efficient and reliable manner.

In order to accomplish that objective the recess in said first part is provided with an edge comprising a straight portion, which extends in a direction transversely to said bar-shaped first part, whereby the deformation at the edge of the plate material comprises a cut in said edge, whereby an edge formed by said cut butts against said straight portion of the edge of said recess. When a cut is being made in the edge of the plate material, said edge is locally deformed in such a manner that the edge of said cut forms a stop surface which is precisely positioned at the location of said straight portion of the edge of said recess, so that the edge of said cut and the edge of said recess butt together. Said abutment will be retained, also when the plate material of the second part springs back slightly after being deformed.

According to a further aspect of the invention the recess is a through hole having a substantially rectangular cross-section is provided in said bar-shaped first part. The recess may thereby have an edge which comprises two straight portions extending in a direction transversely to said bar-shaped first part, each of which transverse portions having a sharp edge, and two straight portions extending in the longitudinal direction of said bar-shaped first part, each of which longitudinal portions having a rounded edge. In that case the edge of the plate material of the second part may be urged into the recess, in such a manner that said transverse portions of the edge of the recess make two cuts in the edge of the plate material, after which the plate material is bent round a rounded longitudinal portion of the edge of the recess between said two cuts. This will be explained in more detail hereafter with reference to an embodiment.

The invention furthermore relates to an automobile provided with a windscreen wiper having the aforesaid features of the invention, and to the arm for such a wiper.

The invention also relates to a method for manufacturing an arm for a windscreen wiper, said arm comprising a first part and a second part connected thereto, whereby, at the location of the connection, said first part is bar-shaped and said second part comprises plate material which is bent round said first part, whereby the plate material of said second part is locally deformed at its edge in such a manner as to extend into a recess in said first part. According to the invention a cut is made in the edge of the plate material by the action of a sharp, straight portion of the edge of the recess, which portion extends in a direction transversely to said bar-shaped first part, whereby an edge formed by said cut comes into abutment with said straight portion of the edge of the recess. A method of this kind may be carried out in one operation.

According to a further aspect of the invention the recess in said first, bar-shaped part can be formed by first making a substantially rectangular hole in said first part, after which the two edge portions of the recess, which extend in the longitudinal direction of the bar-shaped first part, are rounded off by means of a punching operation.

As already described above a pull spring may be provided, which is on the one hand secured to the wiper arm and on the other hand to the aforesaid fastening portion, which fastening portion is pivoted to the wiper arm. The fastening element for said pull spring may be provided on the end of the bar-shaped portion of the first part of the wiper arm, so that the tension of said pull spring can be influenced by an appropriate selection of the position of the first part relative to the second part of the wiper arm.

According to a further aspect of the invention said first part is connected to the end of said spring, whose other end is secured at a fixed position with respect to said second part, after which the first part and the second part of the wiper arm are moved relative to each other whilst the spring tension is being measured, and whereby said first part is fixed to said second part when the spring tension is found to have a predetermined value. The fastening portion may thereby be connected to the second part, and the pull spring may be provided before the first part and the second part of the wiper arm are fixed together, so that a complete wiper arm having the desired spring tension has been formed once the two parts have been fixed together.

Further features of the invention, which may be used both separately and in combination with each other, will be disclosed in the following description of the Figures and be defined in the claims.

Hereafter an embodiment of a wiper arm will be described by way of illustration with reference to the drawing.

DESCRIPTION OF DRAWINGS

FIGS. 1 and 2 show a wiper according to the prior art;

FIGS. 3 and 4 show the connection between the first part and the second part of a wiper arm;

FIG. 5 is a sectional view along line V—V of FIG. 4;

DESCRIPTION

Figure 4:
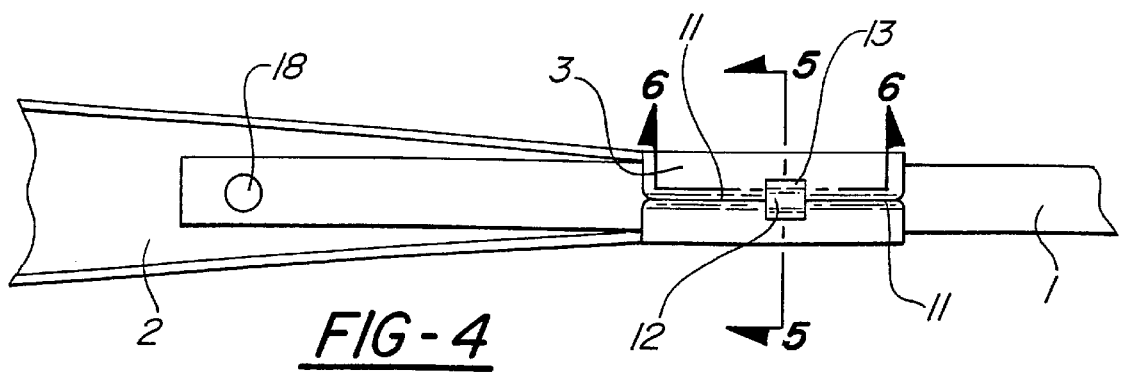

The embodiment is only shown schematically in the Figures.

FIG. 1 is a partially cut-away side view of a wiper arm according to the prior art, and FIG. 2 is a plan view of said wiper arm. The wiper arm comprises a first part 1, which is substantially bar-shaped and which has one end which is bent in such a manner that a wiper blade can be attached thereto. The other end of first part 1 is attached to a second part 2 of the wiper arm, which is made of plate material. A part 3 of the plate material is bent round first part 1, so that said part 3 forms a channel through which said first part 1 extends. In order to prevent first part 1 from moving with respect to second part 2, the two parts 1,2 are fixed together by means of a rivet 4.

The second part 2 of the wiper arm is connected to a fastening portion 6 in such manner as to be capable of pivotal motion about pivot axis 5. Fastening portion 6 has a conical recess 7, to which the end of a shaft having oscillating rotating motion about axis 17 may be attached, so that a reciprocating movement will be imparted to the wiper arm.

Furthermore a pull spring 8 is provided, which pull spring is on the one hand connected to fastening portion 6, via a yoke 9, and which is on the other hand connected to wiper arm 1,2 by means of a yoke 10. Yoke 10 is secured by means of the aforesaid rivet 4. When the wiper arm comprising a wiper blade being attached thereto is mounted on a n automobile, pull spring 8 ensures that the wiper blade is pressed against the windscreen of the automobile with a certain force.

As already said before, the presence of the rivet 4, whose head is exposed to view on the upper side of the wiper arm (FIG. 2), constitutes a drawback of the prior art, as is illustrated in FIGS. 1 and 2.

FIG. 3 shows part of a wiper arm comprising a bar-shaped first part 1, which is fixed to a second part 2, which is made of plate material, which plate material is bent round said first part, thereby forming a channel 3 through which said first part 1 extends. FIG. 4 shows the bottom side of the wiper arm according to FIG. 3.

FIG. 4 shows the manner in which the plate material of the second part 2 is bent to form a channel 3, whereby the edges 11 of the plate material nearly touch each other. The first part 1 of the wiper arm is provided with a rectangular hole 12, and portions 13 of the edges 11 of the plate material of the second part 2 are deformed in such a manner as to extend into said hole 12.

Figure 6:
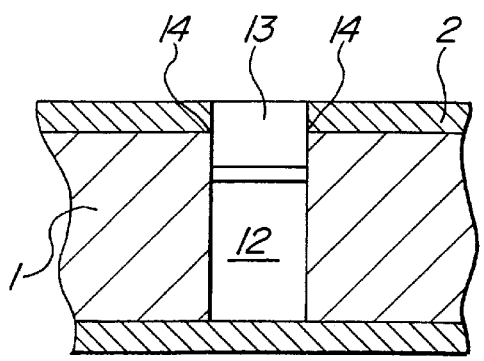
FIG. 6 is a sectional view along line VI—VI of FIG. 4.

FIG. 5 shows a sectional view along line V—V of FIG. 4, and FIG. 6 shows a sectional view along line VI—VI of FIG. 4. As is shown in FIGS. 5 and 6 rectangular hole 12 has two sharp edge portions 14 extending in a direction transversely to bar-shaped first part 1 and two rounded edge portions 15 extending in the longitudinal direction of bar-shaped first part 1. The bent portions 13 of edge 11 extend round the rounded edge portions 15. Cuts were formed in edge 11 when said portions 13 were being bent over, because of the action of the sharp edge portions 14. The bent edge portions 13 thus fit precisely and without play between the transverse edge portions 14 of hole 12, so that the first part 1 and the second part 2 of the wiper arm are fixed together without play, even after the portions 13 would spring back slightly after being deformed.

According to FIG. 4 the end of the bar-shaped first part 1 is provided with a hole 18, into which the aforesaid spring 8 may slip. The location of said hole 18 relative to second part 2 depends on the relative positions of the two parts 1,2, so that the tension of spring 8 is partially determined by said relative positions.

Figure 7:
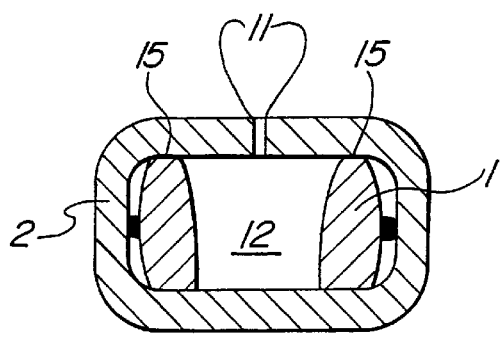
FIG. 7 is a sectional view of the first part and the second part of the wiper arm, in which said parts are shown prior to being fixed together.

FIG. 7 is a sectional view similar to FIG. 5, wherein the edge portions 13 are not bent yet. Said bending of the edge portions 13 may be carried out in the same operation as the forming of the plate material into channel 3, so that the two parts 1,2 can be coupled together in one operation.

Figure 8:
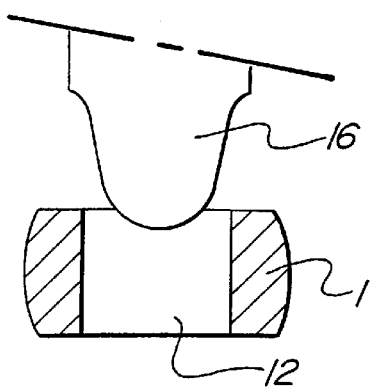
FIGS. 8 and 9 show the forming of the recess in the first part of the wiper arm.
Figure 9:
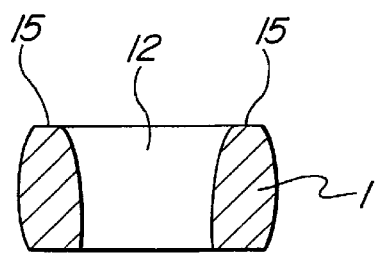

FIGS. 8 and 9 show a cross-section of the first part 1 at the location of rectangular hole 12, whereby a punching tool 16 gives hole 12 its desired shape, with the longitudinal edge portions 15 being rounded off.

The embodiment described is only an illustrative example of an embodiment according to the invention, also other embodiments are possible.

What is claimed is:

1. A windshield wiper, for an automobile, which is provided with an arm comprising a first part and a second part connected thereto, whereby, at the location of the connection, said first part is bar-shaped and said second part comprises plate material which is bent round said first part, which two parts are fixed with respect to each other in that the plate material of said second part is locally deformed at its edge in such a manner as to extend into a recess in said first part, characterized in that said recess is provided with an edge comprising a straight portion, which extends in a direction transversely to said bar-shaped first part, whereby the deformation at the edge of the plate material comprises a cut in said edge, whereby an edge formed by said cut butts against said straight portion of the edge of said recess.

2. A windshield wiper according to claim 1, characterized in that said recess in the bar-shaped first part is a through hole having a substantially rectangular cross-section.

3. A windshield wiper according to claim 2, characterized in that said recess has an edge which comprises two straight portions extending in a direction transversely to said bar-shaped first part, each of which transverse portions having a sharp edge, and two straight portions extending in the longitudinal direction of said bar-shaped first part, each of which longitudinal portions having a rounded edge.

4. An automobile provided with a wiper according to claim 3.

5. An automobile provided with a wiper according to claim 2.

6. A windshield wiper according to claim 1 characterized in that said recess has an edge which comprises two straight portions extending in a direction transversely to said bar-shaped first part, each of which transverse portions having a sharp edge, and two straight portions extending in the longitudinal direction of said bar-shaped first part, each of which longitudinal portions having a rounded edge.

7. An automobile provided with a wiper according to claim 1.

8. A method for manufacturing an arm for a windshield wiper, wherein a first part is connected to a second part, said first part being bar-shaped and said second part comprising plate material, both at the location of said connection, whereby said second part is bent round said first part, whereby the plate material of said second part is locally deformed at its edge in such a manner as to extend into a recess in said first part, characterized in that a cut is made in said edge of the plate material by the action of a sharp, straight portion of the edge of the recess, which portion extends in a direction transversely to said bar-shaped first part, whereby an edge formed by said cut comes into abutment with said straight portion of the edge of the recess.

9. A method according to claim 8, characterized in that the recess in said first, bar-shaped part can be formed by first making a substantially rectangular hole in said first part, after which the two edge portions of the recess, which extend in the longitudinal direction of the bar-shaped first part, are rounded off by means of a punching operation.

10. A method according to claim 9, characterized in that said first part is connected to an end of a spring, whose other end is secured at a fixed position with respect to said second part, after which said first part and said second part are moved relative to each other whilst the spring tension is being measured, and whereby said first part is fixed to said second part when the spring tension is found to have a predetermined value.

11. A method according to claim 8, characterized in that said first part is connected to an end of a spring, whose other end is secured at a fixed position with respect to said second part, after which said first part and said second part are moved relative to each other whilst the spring tension is being measured, and whereby said first part is fixed to said second part when the spring tension is found to have a predetermined value.

12. An arm for a windshield wiper, for an automobile, which comprises a first part and a second part connected thereto, whereby, at the location of the connection, said first part is bar-shaped and said second part comprises plate material which is bent round said first part, which two parts are fixed with respect to each other in that the plate material of said second part is locally deformed at its edge in such a manner as to extend into a recess in said first part, characterized in that said recess is provided with an edge comprising a straight portion, which extends in a direction transversely to said bar-shaped first part, whereby the deformation at the edge of the plate material comprises a cut in said edge, whereby an edge formed by said cut butts against said straight portion of the edge of said recess.

* * * * *